United States Patent [19]

van Leuwen et al.

[11] 3,890,255

[45] June 17, 1975

[54] CURE CATALYZED POLYURETHANE COMPOSITION

[75] Inventors: Bruce G. van Leuwen, Hamden; Donald G. Powell, Woodbridge, both of Conn.

[73] Assignee: Olin Corporation, New Haven, Conn.

[22] Filed: May 31, 1973

[21] Appl. No.: 365,418

[52] U.S. Cl................. 260/2.5 AQ; 260/2.5 AC; 260/2.5 AM; 260/2.5 AP; 260/77.5 AM; 260/77.5 AQ
[51] Int. Cl...................... C08g 22/08; C08g 22/16
[58] Field of Search .. 260/2.5 AQ, 2.5 AM, 2.5 AP, 260/2.5 AC, 77.5 AM, 77.5 AQ

[56] References Cited
UNITED STATES PATENTS

| 3,255,253 | 6/1966 | Kuryla | 260/2.5 |
| 3,331,791 | 7/1967 | Cuscurida | 260/2.5 |
| 3,332,934 | 7/1967 | Booth et al. | 260/2.5 |
| 3,438,986 | 4/1969 | Kaiser et al. | 260/2.5 |
| 3,595,814 | 7/1971 | Lloyd et al. | 260/2.5 |

Primary Examiner—Donald E. Czaja
Assistant Examiner—Eugene C. Rzucidlo
Attorney, Agent, or Firm—F. A. Iskander; T. P. O'Day

[57] ABSTRACT

An improvement is disclosed in the preparation of fast-curing polyurethane elastomers and foams. The improvement is in the use of an oxyalkylated alkanolamine as a cross-linking agent. The resulting polyurethanes are useful in coatings and in various cushioning applications.

9 Claims, No Drawings

CURE CATALYZED POLYURETHANE COMPOSITION

This invention relates to polyurethane compositions and to a method for their preparation. More particularly, the invention relates to an improvement in the art of making fast-curing polyurethane elastomers and foams.

It is known to prepare polyurethane elastomers and foams by reacting an organic polyisocyanate with a polyether polyol. A variety of polyethers have been used for this purpose including the oxyalkylated polyfunctional alcohols, the oxyalkylated polyfunctional alkanolamines, and mixtures thereof. It is also known in this art to utilize various additives in the reaction mixture in order to modify the properties of the resulting polyurethane product. For example, the use of certain curing agents have been found to exert a dual effect in the preparation of polyurethane foam. In addition to accelerating the curing rate, the curing agent has the further effect of enhancing the physical strength properties of the foam.

A well-known group of curing agents for polyurethanes is that of the aromatic diamines, particularly the chlorinated aromatic diamines. However, the utility of these curing agents has been circumscribed by their toxicity, instability on prolonged storage, and high cost. A further drawback connected with the use of the chlorinated aromatic diamines in foam production is that foam forming formulations containing them have a relatively short cream time and thus do not lend themselves to easy processing such as is usually required in foam molding operations.

The alkanolamines, e.g., triethanolamine, and the oxyalkylated alkylene diamines, e.g., oxypropylated ethylene diamine, represent two other groups of known curing agents for use in polyurethanes. To the extent that these are non-viscous, relatively inexpensive liquids with a low level of toxicity, they are preferred over the aromatic diamines. However, as with the aromatic diamines, foam forming formulations containing an alkanolamine or an oxyalkylated alkylene diamine curing agent are characterized by an undesirably shortened cream time and, therefore, they do not lend themselves to easy processing. Futhermore, in addition to their activity as curing agents, these materials exert a marked catalytic effect on the foam forming reaction. Thus they ordinarily can be used in only highly reduced, exactly controlled concentrations, and generally they are not amenable to being used in applications where the speed of reaction must be restrained in order to produce usable molded foam objects.

Now it has been found, in accordance with this invention, that polyurethane forming formulations incorporating selected oxyalkylated alkanolamine curing agents are free of the above drawbacks. Polyurethanes of the invention, prepared from such formulations, are fast-curing, have improved physical properties, and can be used to advantage in the production of coatings and in a variety of foam molding and cushioning applications.

Although the invention is of utility in the preparation of both polyurethane foams and elastomers, i.e., noncellular polyurethanes, the detailed description which follows is directed to the preparation of the polyurethane foams which are preferred according to the invention.

In the preparation of the polyurethane foams of the invention, either the so-called "one-shot method" or the "semi-prepolymer technique" may be employed, the one-shot method being preferred. Any combination of polyols, including polyether polyols and polyester polyols, organic polyisocyanate, foaming agent, catalyst, and other reactants capable of forming a flexible polyurethane foam can be employed in carrying out the process of this invention; and the term "polyurethane foam forming reaction mixture" as used herein is meant to include any such combination. It is preferable, however, to employ polyurethane foam forming reaction mixtures having a free rise density between about 0.8 and about 4.0 pounds per cubic foot. Typical formulations are described in the U.S. Pat. No. 3,072,582, issued Jan. 8, 1963, and Canadian Pat. No. 705,938, issued Mar. 16, 1965.

While, as indicated above, both polyether and polyester polyols can be employed in the practice of this invention, the polyether polyols are preferred. These include, for example, oxyalkylated polyhydric alcohols having a molecular weight in the range of about 700 to about 10,000 and preferably between about 2,500 and about 7,000. The hydroxyl number of these polyether polyols is usually less than about 250 and preferably ranges between about 24 and about 70. The oxyalkylated polyhydric alcohols are generally prepared by reacting, in the presence of an alkaline catalyst, a polyhydric alcohol initiator and an alkylene oxide such as ethylene oxide, propylene oxide, butylene oxide, amylene oxide, epichlorohydrin, and mixtures of these alkylene oxides, by either random or step-wise addition.

Polyhydric alcohol initiators suitable for use in preparing the polyether polyols include ethylene glycol, pentaerythritol, methyl glucoside, propylene glycol, 2,3-butylene glycol, 1,3-butylene glycol, 1,5-pentane diol, 1,6-hexane diol, glycerol, trimethylolpropane, triethylolpropane, 1,3,5-hexanetriol, 1,2,6-hexanetriol, 1,4-6 octanetriol, 1,5,10-dodecane triol, sorbitol, sucrose, mixtures thereof and the like. However, the preferred polyhydric alcohols are the aliphatic diols and triols which contain 2-6 carbon atoms, such as ethylene glycol, propylene glycol, glycerol, and trimethylolpropane. The aliphatic triols are most preferred.

The organic polyisocyanates used in the preparation of the polyurethane foams of this invention include toluene diisocyanate, such as the 80:20 mixture or the 65:35 mixture of the 2,4- and 2,6-isomers, ethylene diisocyanate, propylene diisocyanate, methylenebis-(4-phenyl isocyanate), 3-3'-bitoluene-4,4'-diisocyanate, hexamethylene diisocyanate, naphthalene 1,5-diisocyanate, the polymeric isocyanates, such as polyphenylene polymethylene isocyanate, mixtures thereof and the like. The amount of isocyanate employed in the process of this invention should be sufficient to provide at least about 0.7 NCO group per hydroxyl group present in the reaction system, which includes the polyol as well as any additive or foaming agent employed. An excess of isocyanate compound may be conveniently employed; however, this is generally undesirable due to the high cost of the isocyanates. It is preferable, therefore, to employ sufficient isocyanate to provide no greater than about 1.25 NCO groups per hydroxyl group, and preferably between about 0.9 and about 1.15 NCO groups per hydroxyl group. The ratio of NCO ot OH groups times 100 is referred to as the "index."

The polyurethane foams are prepared in the presence of a foaming agent, reaction catalyst, and preferably a small proportion of a conventional surfactant. The foaming agent employed may be any of those known to be useful for the purpose such as water, as well as organic foaming agents containing up to about seven carbon atoms such as the halogenated hydrocarbons, lower molecular weight alkanes, alkenes, ethers and mixtures thereof. Typically such foaming agents include, for example, monofluorotrichloromethane, dichlorofluoromethane, difluoro-dichloromethane, 1,1,-2-trichloro-1,2,2-trifluoroethane, dichlorotetrafluoroethane, ethyl chloride, methylene chloride, chloroform, carbon tetrachloride, methane, ethane, ethylene, propane, propylene, pentane, hexane, heptane, ethyl ether, diisopropyl ether, mixtures thereof and the like. The amount of foaming agent employed may be varied within a wide range. Generally, however, the halogenated hydrocarbons are employed in an amount from about 1 to 50 parts by weight per 100 parts by weight of the polyol, and generally water is employed in an amount from about 1.0 to 6.0 parts by weight per 100 parts by weight of the polyol.

The catalyst employed in preparing the foams of the invention may be any of the catalysts known to be useful for this purpose, including tertiary amines, organo-metallic salts, and mixture of an organo-metallic salt with one or more tertiary amine, the latter being preferred. Typical tertiary amines include for example triethylamine, triethylene diamine, trimethylamine, tetramethylene diamine, tetramethylbutane diamine, N-methylmorpholine, Nethylmorpholine, dimethylpiperazine, trimethylaminoethylpiperazine, dimethylcyclohexylamine, mixtures of bis(dimethylaminoethylether) and dipropylene glycol such as the 7:3 weight ratio mixture which is available commercially under the trademark Niax A-1, methyldicyclohexylamine, N-cyclohexylmorpholine, dimethylclohexylamine, methyldiethanolamine, mixtures of dimethylcyclohexylamine and 2(3-pentyl)-1-dimethylaminocyclohexane such as may be purchased commercially under the trademark Polycat, bis(dimethylaminoethylpropylether), mixtures of triethylene diamine and dipropylene glycol such as the 1:2 and 1:4 weight ratio mixtures which may be purchased commercially under the trademarks Dabco 33LV and Dabco 8020, respectively, bis (dimethylaminopropylether), and mixtures of these catalysts. The preferred tertiary amine catalysts are triethylenediamine, mixtures of triethylenediamine with dipropylene glycol, mixtures of bis(dimethylaminoethylether) and dipropylene glycol, dimethylcyclohexylamine alone or as a mixture thereof with 2-(3-pentyl)-1-dimethylaminocyclohexane. The tertiary amine catalyst is used in a proportion of about 0.1–1.5, and preferably about 0.25–0.75, parts per 100 parts by weight of the total polyol which is employed in preparing the foam.

Typical organo-metallic salts include for example the salts of tin, titanium, antimony, aluminum, cobalt, zinc, bismuth, lead, and cadmium, the tin salts, i.e., stannic and stannous salts, being preferred. Illustratively such salts include the octoates, dilaurates, diacetates, dioctoates, oleates, and neodeconates of these metals, the octoates being preferred. The organometallic salt catalyst is used in a proportion of about 0–0.5, and preferably about 0.05–0.2, parts per 100 parts by weight of total polyol which is employed in the preparation of the foam.

It is preferred in the preparation of the polyurethane foams of the invention to employ minor amounts of a conventional surfactant in order to further improve the cell structure of the polyurethane foam. Typical of such surfactants are the silicone oils and soaps, and the siloxane-oxyalkylene block copolymers. U.S. Pat. No. 2,834,748 and T. H. Ferringno, *Rigid Plastic Foams* (New York: Reinhold Publishing Corp., 1963), p.p. 38–42, disclose various surfactants which are useful for this purpose. A preferred group of surfactants are the polydimethylsiloxanes such as may be purchased commercially under the trademark "DC-200." Generally up to two parts by weight of the surfactant are employed per 100 parts of total polyol.

In accordance with the invention, the polyurethane foams are prepared in the presence of an oxyalkylated alkanolamine curing agent having substantially no primary hydroxyl end groups. Such curing agents are prepared by a method which is generally well-known in the art, wherein an alkanolamine initiator is condensed, in the presence of an alkaline catalyst, with an alkylene oxide or a mixture of alkylene oxides using random or step-wise oxyalkylation techniques. It is to be understood that the term "alkanolamine" or "alkanolamine initiator" as used in the specification and claims herein is intended to encompass the monoalkanolamines, the dialkanolamines and the trialkanolamines.

Any alkanolamine initiator or mixture thereof which is capable of undergoing condensation with an alkylene oxide may be employed as the initiator in preparing the curing agents of the invention. Usually each alkanol group in such initiators independently contains from 2 to 5 carbon atoms. Illustrative are ethanolamine, diethanolamine, triethanolamine, the mono-, di-, and tri-propanolamine and their isomers, ethanolpropanolamine, diethanolpropanolamine, the mono-, di-, and tributanolamines and their isomers, and so forth. The preferred alkanolamine initiators are those in which each alkanol group independently contains 2-3 carbon atoms such as the ethanolamines, the propanolamines, and the ethanolpropanolamines. The ethanolamines are most preferred.

In preparing the curing agents of the invention, any alkylene oxide, or a mixture of such oxides, may be used. Usually these oxides contain 2–8, and preferably 2–4, carbon atoms. Illustrative are ethylene oxide, propylene oxide, butylene oxide, pentylene oxide, and so forth. As noted above, in accordance with the teachings of the invention, the curing agent must be substantially free of primary hydroxyl end groups. Accordingly ethylene oxide cannot be used as the sole oxyalkylating agent. Rather a sufficient proportion of a higher alkylene oxide must be employed with it, using random or step-wise oxyalkylation techniques, such as to produce a product with essentially no primary hydroxyl end groups. Particularly preferred alkylene oxides are propylene oxide, butylene oxide, or a mixture thereof, propylene oxide being the most preferred.

The oxyalkylation reaction is carried out in the presence of an alkaline catalyst, such as potassium hydroxide, using such a total proportion of alkylene oxide as to yield a hydroxyl number ranging from about 168 to about 1,100, and preferably about 300–600. The most preferred oxyalkylated amine curing agents according to the invention are those which have a hydroxyl number of about 390–570.

In preparing the polyurethane foam of the invention, any suitable additive proportion of the oxyalkylated alkanolamine curing agent may be employed which is effective in catalyzing the curing of the foam. Usually, however, a proportion is employed which ranges from about 0.5 to about 10, and preferably from about 1 to about 6, parts per every 100 parts by weight of the polyol which is used in preparing the foam.

In the practice of this invention, a polyurethane foam-forming reaction mixture comprising the above-described ingredients is fed to a suitable reaction zone such as by pouring into a suitable mold or onto a moving conveyor belt where reaction proceeds. The foaming reaction is exothermic, and auxiliary heat is usually not necessary to effect the reaction, although it may be employed. After the reactants have been admixed for a period of between about 0.1 and about 20 seconds, an emulsion or "cream" forms. As the temperature increases from the reaction, gas bubbles are generated bringing about the formation of an uncured cellular gel material which usually cures fairly rapidly. Once cured, the foam will be ready for use in various cushioning applications.

In accordance with a particularly preferred embodiment of the invention, the polyurethane foam is prepared from a formulation, as generally described above, which comprises a select polyether polyol in order to achieve a foam having a combination of physical properties that meets the requirements of the automotive industry. Thus the polyether polyol which is employed according to this embodiment is an oxypropylated, oxyethylated triol characterized by (1) a molecular weight of at least about 4,000, and preferably about 5,800–6,600, (2) an aliphatic triol nucleus; (3) polyoxypropylene chain segments attached through one end thereof to the nucleus, and (4) polyoxyethylene chain segments attached through one end thereof to the polyoxypropylene chain segments, with the proviso that the resulting polyether polyol contains about 7-18, and preferably about 14–16, moles of ethylene oxide per each mole of the aliphatic triol. It is also preferred according to this embodiment of the invention to employ as the organic isocyanate a mixture of (1) toluene diisocyanate and (2) a polymethylene polyphenylene isocyanate, such as may be purchased commercially under the trademark "PAPI," in a weight ratio, (1):(2), of about 75:25 to about 94:6 and preferably about 85:15 to about 92:8.

Polyurethane foam forming formulations incorporating the curing agents of the invention are eminently suitable for molding and similar applications where the cream time and/or the foaming rate must be controlled or restrained to a certain extent. This is by virtue of the fact that these curing agents, unlike the amine curing agents of the prior art, have been found to exert little or practically no catalytic effect on the foaming reaction itself. Neither does their presence materially shorten the cream time. Furthermore, the curing agents of the invention provide a more economical alternative to the aromatic diamines inasmuch as they can be easily prepared from readily available, relatively inexpensive materials. Additionally they are relatively non-toxic and exhibit a relatively high degree of stability on prolonged storage.

The polyurethane foams of invention are characterized by a fast curing rate usually without the application of external heat, although such heat may be used, if desired, to further speed up the curing process. They also possess improved physical strength properties, being highly resistant to flexural fatigue. By virtue of these properties, the foams of the invention are of particular utility in making molded furniture parts and automotive seats.

The following examples are provided to illustrate the invention. In these examples, all parts and percentages are by weight unless otherwise specified.

EXAMPLE 1

A flexible polyurethane foam was prepared from the following ingredients in the indicated proportions:

| Ingredients | Parts by Weight | |
| --- | --- | --- |
| Polyether polyol[1] | 100.0 | |
| Oxypropylated triethanolamine curing agent (m. wt. 317) | 2.1 | (0.0066 mole) |
| Water | 3.1 | |
| Triethylene diamine[2] | 0.3 | |
| Bis (2-dimethylaminoethyl) ether[3] | 0.05 | |
| Stannous octoate | 0.03 | |
| Surfactant[4] | 0.04 | |
| Polyisocyanate mixture[5] (100 index) | 39.4 | |

[1] This is a 6000 molecular weight polyether triol prepared by sequentially oxyalkylating glycerin first with 90 moles of of propylene oxide and then with 15 moles of ethylene oxide.
[2] This is a commercially obtained product, sold under the trademark "Dabco 33LV" and consisting mainly of ⅓ triethylene diamine and ⅔ dipropylene glycol.
[3] This is another commercially purchased product sold under the trademark "NIAX A-1" and consisting mainly of 70% bis (2-dimethylaminoethyl) ether and 30% dipropylene glycol.
[4] This is a polymethylsiloxane purchased commercially under the trademark "DC-200-5".
[5] This is a mixture of 4 parts toluene diisocyanate (80/20 mixture of 2,4/2,6-isomers) to 1 part polymethylene polyphenylene isocyanate. The latter is available commercially under the trademark "PAPI".

The above mixture was hand mixed at room temperature and immediately poured into an aluminum mold maintained within a temperature range of 140°–150°F. Using a stop-watch, the "cream time", "rise time", "gel time," and "demold time" were measured, all being from the moment the mixture is placed into the mold. The "cream time" is the time elapsed, up to the point when foaming commences, during which time the mixture is transformed from a liquid to a cream or emulsion. The "rise time" is the time elapsed for completion of the foaming reaction or expansion of the foam. This is usually evidenced by the appearance of gas bubbles on the surface of the foam. The "gel time" is the time elapsed for the resulting foam to become a self-supporting body as evidenced by the foam exhibiting resistance to being penetrated by a dull instrument. The "demold time" is the minimum time elapsed after which the foam can be removed from the mold as a wholesome body free of outer defects which would otherwise result from premature demolding. The results of these time measurements are provided in Table I below.

The foam was subjected to various physical tests, the results of which are also indicated in Table 1 below.

Comparisons 1–2

For purposes of comparison, two foams, indentified as C-1 and C-2 were prepared and tested following the exact procedure of Example 1 except that prior art curing agents were used instead of the oxypropylated triethanolamine employed of Example 1. Thus in preparing C-1 0.0066 mole (1.0 part by weight) of triethanolamine was used as the curing agent; and in preparing C-2, 0.0066 mole (2.5 parts by weight) of a eutectic mixture of methylene bridged aromatic amines, purchased commercially under the trademark "Curene 126," was used as the curing agent. The results are provided in Table I below.

Table I

|  | Example 1 | C-1 | C-2 |
| --- | --- | --- | --- |
| Cream Time (sec.) | 14 | 8 | 10 |
| Rise time (sec.) | 144 | 129 | 140 |
| Gel time (sec.) | 312 | 192 | 225 |
| Demold Time (min.) | 8 | 10 | 10 |
| Core density (lbs. per. cu. ft.) | 2.7 | 3.0 | 2.6 |
| Indentation load deflection (lbs., per ASTM D-1564-64T) |  |  |  |
| a) at 25% deflection | 35 | 29 | 34.5 |
| b) at 65% deflection | 105 | 88 | 108 |
| c) SAC factor (b÷a) | 3.0 | 3.0 | 3.1 |
| Tensile strength (psi.) | 16.4 | 16.8 | 21.3 |
| Ball rebound (%, per ASTM D-1564-64T) | 57 | 58 | 54 |
| Flex fatigue | 9 | 9 | 10 |

As seen from Table 1, while all three foams have substantially similar desirable physical properties, the foam of Example 1 has a markedly longer cream time and yet a shorter demold time than the foams C-1 and C-2. This demonstrates the improvement resulting from the use of the curing agents of the invention as compared with prior art amine curing agents.

EXAMPLE 2

The identical procedure of Example 1 was employed, except that instead of 2.1 parts, 4.2 parts (0.013 mole) of the oxypropylated triethanolamine curing agent were used. The foam data are provided in Table II below.

Comparisons 3–4

Again for purposes of comparison, two foams, identified as C-3 and C-4, were prepared and tested following the procedure of Example 2 except that prior art curing agents were used instead of the oxypropylated amine. Thus in preparing C-3, 0.013 mole (2.0 parts) of triethanolamine curing agent was used; and in preparing C-4, 0.013 mole (5.0 parts) of the aromatic amine mixture curing agent employed in Comparison 2 was used. The results are recorded in Table II below.

Table II

|  | Example 2 | C-3 | C-4 |
| --- | --- | --- | --- |
| Cream Time (sec.) | 13 | 8 | 10 |
| Rise Time (sec.) | 165 | 129 | 138 |
| Gel Time (sec.) | 280 | 198 | 240 |
| Demold Time (sec.) | 10 | 10 | 12 |
| Core density (lbs. per cu. ft.) | 2.7 | 2.8 | 2.7 |
| Indentation load deflection (lbs., per ASTM D-1564-64T) |  |  |  |
| a) at 25% deflection | 29 | 30 | 29 |
| b) at 65% deflection | 85 | 91 | 97 |
| c) SAC factor (b:a) | 2.9 | 3.0 | 3.3 |
| Tensile strength (psi.) | 19.4 | 17.6 | 21.8 |
| Ball rebound (%, per ASTM D-1564-64T) | 50 | 52 | 53 |
| Flex fatigue | 8 | 8 | 10 |

EXAMPLES 3–4

A polyurethane foam was prepared following the procedure of Example 1, except that instead of the 2.1 parts of the oxypropylated triethenolamine curing agent, 1.7 parts of oxypropylated monoethanolamine (molecular weight 255) were used in Example 3, and 3.4 parts of oxypropylated monoethanolamine (molecular weight 255) were used in Example 4. The physical properties of the resulting foams are provided in Table III below.

EXAMPLES 5–6

Two polyurethane foams were prepared following the procedure of Example 1, except that instead of the 2.1 parts of the oxypropylated triethanolamine curing agent, 2.0 and 4.0 parts of oxypropylated diethanolamine (molecular weight 295) were used in Example 5 and Example 6, respectively. The physical properties of the resulting foams are provided in Table III below.

Table III

|  | Example 3 | Example 4 | Example 5 | Example 6 |
|---|---|---|---|---|
| Core density (lbs. per cu. ft.) | 2.6 | 2.6 | 2.7 | 2.8 |
| Indentation load deflection (lbs., per ASTM D-1564-64T) | | | | |
| a) at 25% deflection | 27 | 21.5 | 24.5 | 32.5 |
| b) at 65% deflection | 85 | 67 | 81.5 | 104 |
| c) SAC factor (b÷a) | 3.0 | 3.2 | 3.2 | 3.2 |
| Tensile strength (psi.) | 17.2 | 14.1 | 14.5 | 17.1 |
| Ball rebound (%, per ASTM D-1564-64T) | 53 | 52 | 56 | 49 |
| Flex fatigue | 12 | 13 | 6 | 6 |

We claim:

1. In a flexible polyurethane foam prepared by the process which comprises reacting, in the presence a reaction catalyst, a foaming agent, and a curing agent, an organic polyisocyanate with an oxypropylated oxyethylated polyether triol characterized by (1) a molecular weight of about 5,800–6,600, (2) an aliphatic triol nucleus, (3) polyoxypropylene chain segments attached through one end thereof to said nucleus, and (4) polyoxyethylene chain segments attached through one end thereof to said polyoxypropylene chain segments, with the proviso that said polyether triol contains about 7–18 moles of said ethylene oxide per every mole of said aliphatic triol, the improvement of employing as said curing agent an oxyalkylated alkanolamine, in a proportion of about 1–6 parts per every 100 parts by weight of said polyether triol, said oxyalkylated alkanolamine being substantially free of primary hydroxy groups, having a hydroxyl number of about 390–570, and being the product of condensing an alkylene oxide, selected from the group consisting of propylene oxide, butylene oxide and a mixture thereof, with an alkanolamine selected from the group consisting of an ethanolamine, a propanolamine and an ethanolpropanolamine.

2. The polyurethane foam of claim 1 wherein said curing agent is an oxypropylated triethanolamine.

3. The polyurethane foam of claim 1 wherein said reaction catalyst is a mixture of an organo-metallic salt and one or more tertiary amines.

4. A one-shot polyurethane foam as claimed in claim 3 wherein said organo-metallic salt is stannous octoate and said tertiary amine is selected from the group consisting of triethylenediamine, a mixture of triethylenediamine and dipropylene glycol, a mixture of bis(dimethylaminoethyl ether) and dipropylene glycol, dimethylcyclohexylamine, and a mixture of demethylcyclohexylamine and 2-(3-pentyl)-1-dimethylaminocyclohexane.

5. The polyurethane foam of claim 4 wherein said foam is prepared in the presence of a polydimethylsiloxane surfactant.

6. The polyurethane foam of claim 5 wherein said polyether triol contains about 14–16 moles of said ethylene oxide per every mole of said aliphatic triol.

7. The polyurethane foam of claim 6 wherein said foaming agent is water.

8. The polyurethane foam of claim 7 wherein said aliphatic triol is glycerin and said polyether triol has a molecular weight of about 6,000 and is the product of sequentially condensing glycerin first with about 90 moles of propylene oxide and then with about 15 moles of ethylene oxide.

9. The polyurethane foam of claim 8 wherein said curing agent is an oxypropylated triethanolamine.

* * * * *